US006666131B2

(12) United States Patent
Bizard

(10) Patent No.: US 6,666,131 B2
(45) Date of Patent: Dec. 23, 2003

(54) COOKING APPLIANCE HAVING A TANK AND A SECURE EMPTYING DEVICE

(75) Inventor: Jean-Claude Bizard, Fontaine les Dijon (FR)

(73) Assignee: SEB S.A., Ecully (FR)

( * ) Notice: Subject to any disclaimer, the term of this patent is extended or adjusted under 35 U.S.C. 154(b) by 0 days.

(21) Appl. No.: 10/271,545

(22) Filed: Oct. 17, 2002

(65) Prior Publication Data

US 2003/0070557 A1 Apr. 17, 2003

(30) Foreign Application Priority Data

Oct. 17, 2001 (FR) .............................. 01 13395

(51) Int. Cl.⁷ ................................ A47J 37/12
(52) U.S. Cl. ..................... 99/403; 99/330; 99/408; 219/436; 219/441; 126/275 E; 126/391.1
(58) Field of Search ................... 99/330, 331–333, 99/337, 338, 403–418, 444–450, 467, 470, 516; 219/441, 429, 436, 438, 439, 442, 530; 312/308, 329; 210/162, 167, DIG. 8; 126/39.1, 20, 275 E, 376.1, 377.1, 391.1

(56) References Cited

U.S. PATENT DOCUMENTS 2,597,695 A * 5/1952 Braski et al. ............. 99/331 X
2,867,164 A * 1/1959 Lutze ........................ 99/403
3,845,702 A 11/1974 Miles

FOREIGN PATENT DOCUMENTS

| DE | 93 15 764 | 2/1994 |
|---|---|---|
| DE | 199 07 150 | 8/2000 |
| GB | 661921 | 11/1951 |

* cited by examiner

Primary Examiner—Timothy F. Simone
(74) Attorney, Agent, or Firm—Browdy and Neimark, P.L.L.C.

(57) ABSTRACT

A cooking appliance composed of: a housing; a vessel provided to be placed in the housing and arranged to receive a cooking bath; an emptying device provided in the vessel for permitting the cooking bath to be drained from the vessel; an emptying receptacle for receiving the cooking bath from the vessel; a first valve associated with the emptying device; a maneuvering button associated with the emptying device; and a control mechanism mounted on the emptying receptacle and interposed between the maneuvering button and the first valve for moving the first valve between open and closed positions and response to movements of the maneuvering button, wherein the emptying receptacle is removable from the housing.

21 Claims, 3 Drawing Sheets

COOKING APPLIANCE HAVING A TANK AND A SECURE EMPTYING DEVICE

BACKGROUND OF THE INVENTION

The present invention relates to the general technical field of cooking appliances having a vessel, or tank, provided to receive a cooking bath. The present invention concerns more particularly appliances of the type mentioned above having a device for emptying the cooking bath contained in the vessel.

The present invention concerns particularly, but not exclusively, fryers. In effect, a cooking bath is not limited to a bath of oil or of melted fat, but can equally consist of any edible material that is sufficiently fluid to flow through an emptying device, and particularly a water-based liquid.

The patent documents U.S. Pat. No. 2,597,695, CH 325786 and FR 2665068 disclose fryers having an emptying conduit. However, none of them provides for a receptacle for collecting cooking liquid. The patent document FR 2773976 describes a fryer having an emptying conduit and a receptacle supported by a drawer mounted in the housing of the appliance. The utilization of such appliances requires careful attention on the part of the user with regard to the emptying of cooking liquid out of the housing.

The U.S. Pat. No. 2,867,164 describes a fryer of the industrial type having a vessel and an emptying receptacle housed in a frame. The vessel has an emptying conduit closed by a gate, or valve. The emptying receptacle is mounted in a removable manner on the inner face of a door of the frame. The transposition of such a form of construction into a household appliance appears to present safety issues.

BRIEF SUMMARY OF THE INVENTION

An object of the present invention is to increase the security of cooking appliances having a vessel provided with an emptying device.

Another object of the invention is to improve the convenience of use of cooking appliances having a vessel provided with an emptying device.

An additional object of the invention is to provide an appliance of the type described above having a simple structure.

Yet another object of the invention is to provide an appliance of the above-described type having a compact structure.

These objects are achieved with a cooking appliance comprising: (a) a housing; (b) a vessel provided to be placed in the housing and arranged to receive a cooking bath; (c) an emptying device provided in the vessel for permitting the cooking bath to be drained from the vessel; (d) an emptying receptacle for receiving the cooking bath from the vessel via the emptying device; (e) a first valve associated with the emptying device; (f) a maneuvering button associated with the emptying device; and (g) a control mechanism mounted on the emptying receptacle and interposed between the maneuvering button and the first valve for moving the first valve between open and closed positions in response to movements of the maneuvering button; (h) wherein the emptying receptacle is removable from the housing.

The cooking appliance according to the present invention assures that, in the absence of the emptying receptacle, there is no risk that the user can proceed to empty the appliance. In addition, by the fact that the control mechanism is mounted on the emptying receptacle, the vessel can be removable with respect to the housing, and can thus be placed in a washing machine. The emptying receptacle can be disposed in the housing or can form a base on which the housing rests.

Advantageously, the maneuvering button is mounted on the emptying receptacle. This arrangement permits a structural simplification. Alternatively, the maneuvering button can, for example, be mounted on the housing.

Advantageously, the housing has a lateral opening into which the emptying receptacle can be at least partially inserted. This arrangement permits handling of the emptying receptacle to be facilitated. Alternatively, the housing can for example be made of two parts, an upper part at least partially surrounding the vessel, and a lower part supporting the emptying receptacle, the upper part being able to be withdrawn to permit access to the emptying receptacle.

Advantageously then, the maneuvering button is mounted on an outside lateral face of the emptying receptacle. This arrangement permits a structural simplification. Alternatively, the maneuvering button can, for example, be accessible through a hatch, or door, provided on a face of the housing.

According to one embodiment, the control mechanism has a cam provided to cooperate with the valve. Such a form of construction is simple and reliable.

Advantageously, the cam is carried by a movable control piece mounted on an inlet conduit communicating with the emptying receptacle, the movable control piece having a funnel provided to supply a filling opening of the inlet conduit when the cam opens the valve. Such a form of construction permits the number of parts to be limited.

Advantageously then, the movable control piece is driven in rotation by the maneuvering button. Such a form of construction is particularly simple and reliable.

Also advantageously, the cam is arranged above the funnel. This arrangement permits a particularly compact control mechanism to be created.

Also advantageously, the control mechanism has a bolt, or latch, provided to cooperate with a striking plate belonging to the valve when the valve is brought to its open position. This arrangement permits the emptying receptacle to be bolted, or latched, in order to prevent withdrawal of the receptacle from the housing during an emptying operation.

According to one advantageous form of construction, the bolt is formed by a lateral face of the cam, which permits the structure to be further simplified.

According to a further advantageous form of construction, the striking plate is formed by a longitudinal slot provided at the lower end of a conduit in which is housed a movable blocking piece of the valve, which is displaced by the cam. This arrangement also permits the structure to be simplified.

Also advantageously, the appliance is provided with a movable safety piece that has a first cam provided to be driven by the control mechanism when the maneuvering button is operated to open the valve, a second cam provided to be driven by the control mechanism when the maneuvering button is then moved to close the valve, and a blocking abutment provided to block the control mechanism in order to prevent opening of the valve. This arrangement prevents the occurrence of a renewed emptying of the vessel if the emptying receptacle has first been withdrawn at least partially from the housing, and then put back in place, after a first emptying, or in other words if the emptying receptacle has not been manipulated in such a manner as to indicate that it has been emptied.

Advantageously then, the movable safety piece is pushed back by the emptying receptacle, through the intermediary of a flexible blade, when the receptacle is replaced in the housing, the flexible blade being moved aside when the movable safety piece reaches a stopping abutment. This arrangement assures, in a simple manner, the proper positioning of the safety piece during installation, or reinstallation of the receptacle into the housing.

According to an advantageous form of construction, the emptying device has a thermostatic valve. This permits the safety of the appliance to be further improved and also allows the use of less durable, and thus less costly, materials for the emptying receptacle and/or the control mechanism.

According to another advantageous form of construction, a filter is arranged upstream of the emptying device. This arrangement prevents residues present in the cooking bath from adversely affecting the operation of the emptying device. This arrangement also permits the quality of the cooking bath to be improved when successive batches of food are fried with the same bath.

DETAILED DESCRIPTION OF THE INVENTION

The appliance shown in FIGS. 1–6 is a fryer having a housing 1 provided with an upper opening for receiving a vessel, or tank, 2 that is intended to hold a cooking liquid. The upper opening can be closed by a lid (not shown). Housing 1 also has a lateral opening for introduction and removal of an emptying receptacle 3.

Figure 3:
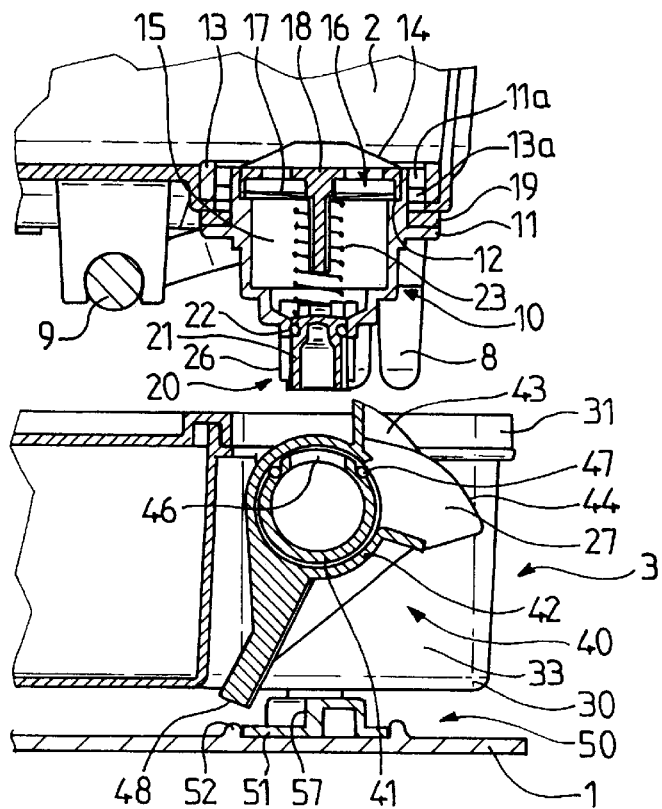
FIG. 3 is an elevational, cross-sectional detail view of the appliance of FIG. 1, in a position after emptying of the vessel.
Figure 4:
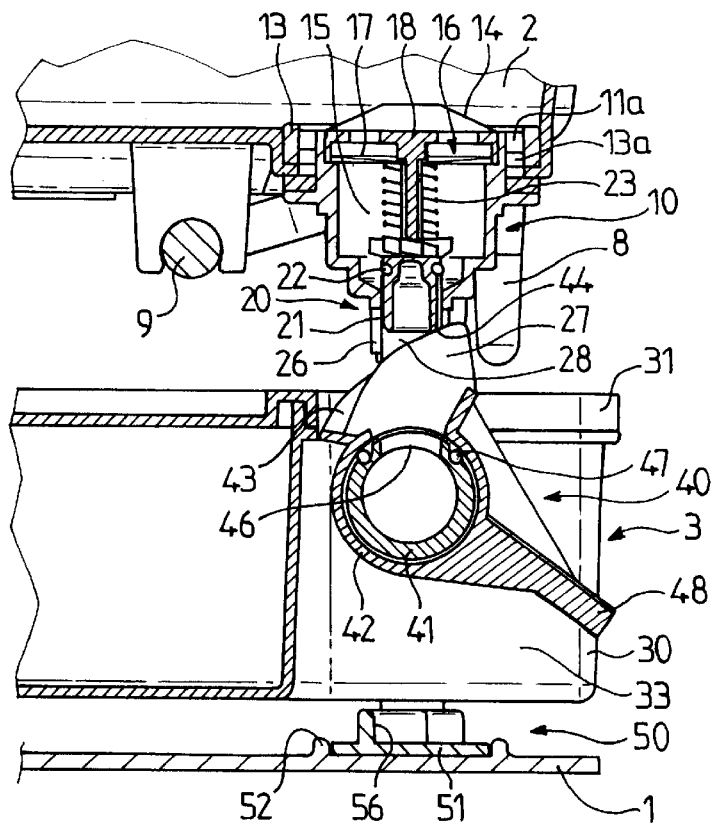
FIG. 4 is a view similar to that of FIG. 3 showing the appliance in the position provided for emptying the contents of the vessel.

As shown most clearly in FIGS. 3 and 4, vessel 2 is provided with an emptying device 10. Vessel 2 is advantageously removable from housing 1 and is provided with means, such as feet 8, which enable vessel 2 to be placed on a working surface. If desired, electric heating means 9 can be fixed under vessel 2. Alternatively, the electric heating means can be arranged in housing 1 or even within vessel 2.

Emptying device 10 comprises an evacuation conduit 15 that extends from the bottom of vessel 2. A filter 14 can be placed above the inlet end of conduit 15 in order to protect the conduit. A spring-loaded valve 20 is installed to close the bottom of conduit 15 and a thermostatic valve 16 is provided in conduit 15 between filter 14 and valve 20.

Conduit 15 is constituted by a body 11 that is preferably made of a plastic that is sufficiently resistant to the elevated temperatures that can arise in a cooking bath, preferably a plastic that is able to resist temperatures as high as 250° C., one such plastic material being sold under the trade name Amodel. Body 11 is installed to be removable from vessel 2. A seal, or joint, 19 is interposed between vessel 2 and body 11. Joint 19 is advantageously secured to body 11 in order to avoid being lost during removal of the emptying device and to assure that the joint will not be forgotten when the emptying device is reinstalled.

Filter 14 is mounted to be removable from vessel 2 and body 11. According to the exemplary embodiment shown in the drawing, filter 14 is secured to a ring 13 constructed to form a bayonet attachment with body 11. Ring 13 is housed in a removable manner in a recess in the bottom of vessel 2. Ring 13 is prevented from rotation with respect to vessel 2. The upper part of body 11 is engaged in an opening formed in the bottom of vessel 2, and is provided with ramps 11a that cooperate with ramps 13a of ring 13 to form the bayonet assembly.

Thermostatic valve 16 includes a bimetallic disk 17, preferably of the snap-action type, fixed to the lower face of a perforated plate 18 that extends across the upper end of body 11. Plate 18 is, for example, crimped to the interior of body 11.

Disk 17 is shown in FIGS. 3 and 4 in the position in which valve 16 is opened, this corresponding to the low temperature position. When disk 17 is in the high temperature position, it closes conduit 15 by coming to bear against an internal annular shoulder 12 of body 11. The transition temperature between the high temperature position and the low temperature position during cooling of disk 17 is, for example, of the order of 90° C. in the case of a fryer.

The spring-loaded valve 20 includes a movable blocking piece 21 equipped with a peripheral toroidal seal, or joint, 22. Piece 21 is mounted on a spring 23 that bears against the lower face of disk 17. The rest position of spring 23 corresponds to that shown in FIG. 3 in which valve 20 is closed.

Emptying receptacle 3 has a volume sufficient to receive the cooking bath contained in vessel 2. Emptying receptacle 3 has a recovery trough 30 closed by a lid 31, and has an outer lateral wall 32. If desired, wall 32 can be made at least partially of a transparent or translucent material to permit the user to observe the filling of emptying receptacle 3.

Receptacle 3 also has an emptying control mechanism 40 which can advantageously be mounted on recovery trough 30. Control mechanism 40 includes a movable control piece 42 mounted around an inlet conduit 41 that opens into a lateral wall 33 of trough 30. Movable control piece 42 is composed of a funnel 43 and a cam 44 provided to actuate spring-loaded valve 20. Movable control piece 42 is connected to a maneuvering button 45 mounted on the outer lateral wall 32 of emptying receptacle 3.

Maneuvering button 45 is mounted to be rotated in order to drive piece 42 in rotation. The lateral wall of conduit 41 has a filling opening 46 surrounded by a toroidal seal, or joint, 47 that provides a secure seal between conduit 41 and movable control piece 42. Maneuvering button 45 is movable, for example in rotation, between a utilization position corresponding to the position shown in FIGS. 2 and 3 and an emptying position corresponding to the position shown in FIGS. 1 and 4. In the emptying position, shown most clearly in FIG. 4, funnel 43 is disposed above filling opening 46, and cam 44 pushes valve 20 upwardly, against the force of spring 23.

The appliance further includes a safety device 25 constructed to prevent withdrawal of emptying receptacle 3 when valve 20 is opened. For this purpose, the lower end of conduit 15 has a longitudinal slot 26, and cam 44, arranged as a part of funnel 43, comes to be inserted into slot 26 during rotation of movable control piece 42 toward the emptying position, as shown in FIG. 4. Control mechanism 40 thus includes bolt 27 provided to cooperate with a striking plate 28, forming a part of valve 20, when valve 20 is in its opened position. In the illustrated embodiment, bolt 27 is formed by a lateral face of cam 44 and striking plate 28 is formed by walls bounding slot 26.

The appliance according to the invention includes a further safety device 50 that acts to prevent two consecutive emptyings without at least partial withdrawal of receptacle 3 from housing 1.

Figure 5:
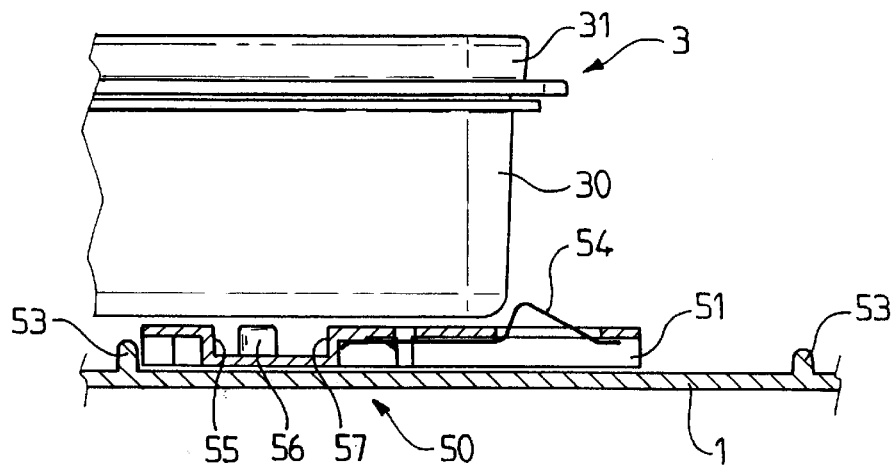
FIG. 5 is an elevational view, partly in cross-section, showing the emptying receptacle as it is being put back in place in the housing.

For this purpose, device 50 includes a movable safety piece 51 disposed between housing 1 and emptying receptacle 3. In the illustrated embodiment, piece 51 is mounted on the bottom wall of housing 1. Piece 51 is guided by guide abutments 52 for movement in a longitudinal direction perpendicular to the plane of FIGS. 3 and 4. This longitudinal movement of piece 51 is limited by stops 53 located ahead of and behind, respectively, piece 51. As shown in FIG. 5, a flexible blade 54 is mounted on piece 51 to come to abut against the bottom of emptying receptacle 3 during introduction of receptacle 3 into housing 1, and to then bear against receptacle 3 when receptacle 3 has been fully introduced into housing 1 and piece 51 is blocked by one of the abutments 53.

Figure 6:
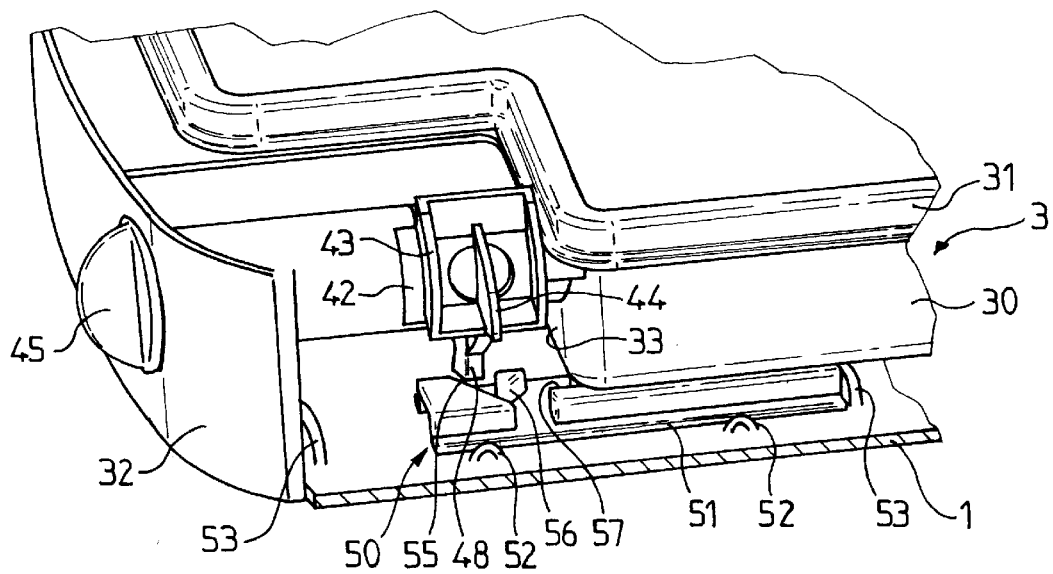
FIG. 6 is a perspective, detail view of the emptying receptacle after it has been put back in place in the housing and before a new emptying operation.

FIG. 6 shows emptying receptacle 3 after having been fully introduced into housing 1. Piece 51 includes a first cam 55 provided to cooperate with a foot 48 extending downwardly from movable control piece 42 when maneuvering button 45 has been brought to its emptying position after receptacle 3 has been fully introduced into housing 1. Piece 51 also includes a second cam 56 provided to cooperate with foot 48 when maneuvering button 45 is moved into its utilization position after an emptying operation. Piece 51 includes a blocking abutment 57 provided to prevent rotation of movable control piece 42 when maneuvering button 45 is urged toward the emptying position after a new utilization without prior withdrawal of emptying receptacle 3.

The appliance is used in the following matter.

When the user fully introduces emptying receptacle 3 into housing 1, cam 44 cannot reach movable blocking piece 21 of valve 20, which is protected by the lower end of conduit 15. Emptying receptacle 3 comes in contact with flexible blade 54, as shown in FIG. 5, and pushes movable safety piece 51 toward a position that is remote from the lateral opening of housing 1. When piece 51 comes to abut against the associated stop 53 (the right-hand stop in FIGS. 5 and 6), flexible blade 54 is depressed and comes to rub against the bottom of emptying receptacle 3. Flexible blade 54 permits piece 51 to be maintained in place with respect to receptacle 3.

Figure 1:
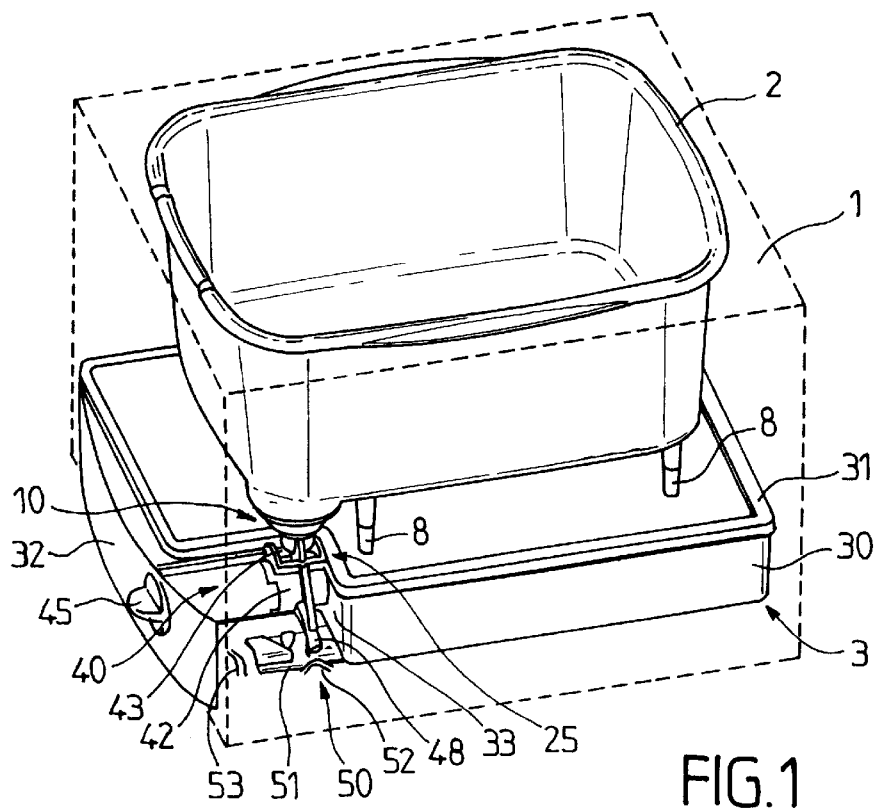
FIG. 1 is a perspective view of one embodiment of a cooking appliance according to the invention, in a position provided for emptying the contents of the vessel, or tank, with the exterior housing being shown in broken lines.
Figure 2:
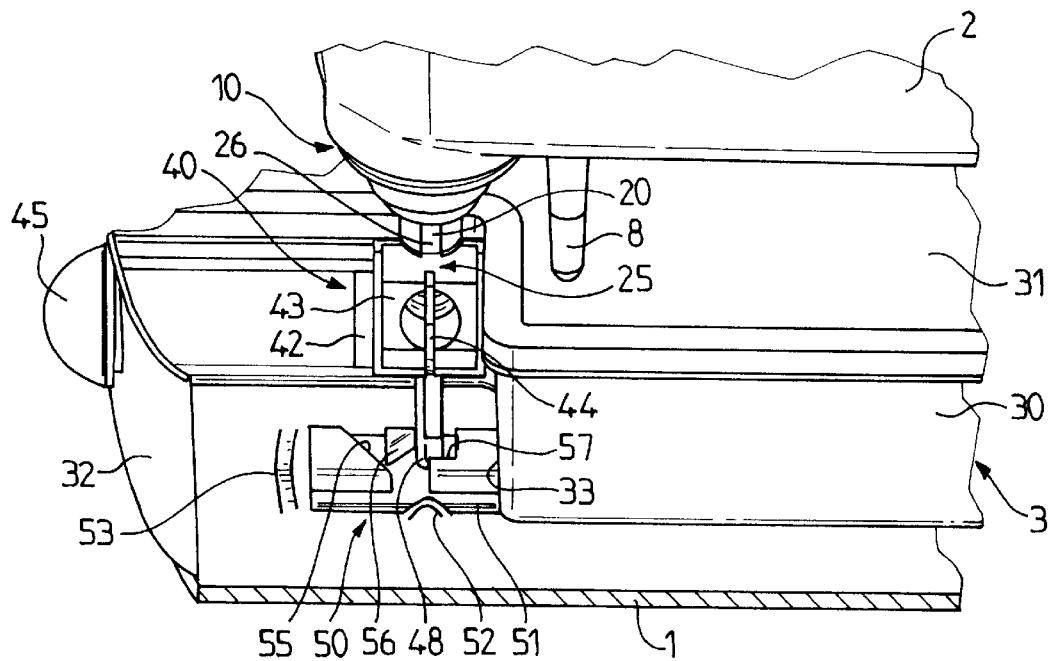
FIG. 2 is a perspective view of a portion of the appliance of FIG. 1, in a position after emptying of the vessel, showing the safety device provided to prevent successive emptyings without at least partial withdrawal of the emptying receptacle.

When emptying receptacle 3 has been fully installed in housing 1, as shown in FIG. 6, the user can rotate maneuvering button 45 toward the emptying position shown in FIGS. 1 and 4. During rotation of control piece 42, foot 48 engages cam 55 to displace safety piece 51 toward an intermediate position, i.e., toward the left in FIG. 6. At the end of the rotation travel of piece 42, cam 44 lifts blocking piece 21 of valve 20, as shown in FIG. 4. Then, liquid contained in vessel 2 can flow through funnel 43 and filling opening 46 of conduit 41 and into receptacle 3 if thermostatic valve 16 is opened. Cam 44, blocked by slot 26, prevents withdrawal of emptying receptacle 3.

In order to withdraw emptying receptacle 3 from housing 1, the user returns maneuvering button 45 to the utilization position, shown in FIG. 3. During the accompanying rotation of control piece 42, foot 48 pushes cam 56 so as to displace safety piece 51 into the forward position shown in FIG. 2. Cam 44 then moves clear of emptying device 10 and valve 20 recloses. Foot 48 moves clear of safety piece 51 and the user can then withdraw emptying receptacle 3 from housing 1.

Due to the functioning of safety piece 51, a new emptying is prevented if emptying receptacle 3 has not been withdrawn from housing 1 and then put back in place. In effect, during rotation of control piece 42, foot 48 is blocked by abutment 57 and cam 44 cannot reach valve 20. In order to allow a new emptying, it is necessary to withdraw receptacle 3 at least until it has moved away from flexible blade 54, as shown in FIG. 5, in order to push piece 51 back with the aid of flexible blade 54 during reintroduction of receptacle 3. A slight withdrawal of receptacle 3 will not guarantee that a reintroduction of receptacle 3 will result in a pushing back of piece 51 with the aide of flexible blade 54.

Safety device 50 prevents a second emptying from being performed if receptacle 3 has not been withdrawn at least partially by a certain amount from housing 1 and then put back in place, through the intermediary of displacements of piece 51 during maneuvering of control device 40 from the utilization position toward the emptying position and back, as well as during withdrawal and then reintroduction of emptying receptacle 3.

The capacity of emptying receptacle 3 can thus be limited to the capacity of vessel 2, without risking an overflow of receptacle 3 as a result of two consecutive emptyings of vessel 2.

According to one alternative, emptying control mechanism 40 need not be secured to recovery trough 30, and can for example be mounted on lid 31 of emptying receptacle 3.

According to another alternative, control piece 42 is not necessarily mounted between maneuvering button 45 and emptying receptacle 3.

According to another alternative, maneuvering button 45 can be mounted on a lateral face of the emptying receptacle housed within the housing when the receptacle is installed in the housing. The maneuvering button can then be accessible through a hatch, or door, provided in the lateral wall of the housing.

According to another alternative, maneuvering button 45 can be mounted on housing 1 of the appliance, for example opposite the lateral window of the housing provided for insertion of the emptying receptacle. The connection between the maneuvering button and the control mechanism then takes place upon insertion of the emptying receptacle into the housing.

According to yet another alternative, flexible blade 54 can be mounted on one of the outside faces of the emptying receptacle or even on another internal face of the housing.

According to still another alternative, emptying receptacle 3 can form a base receiving, in a removable manner, the housing surrounding the vessel.

This application relates to subject matter disclosed in French Application Number FR 01 13395, filed on Oct. 17, 2001, the disclosure of which is incorporated herein by reference.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of alternative forms without departing from the invention.

Thus the expressions "means to . . . " and "means for . . . ", or any method step language, as may be found in the specification above and/or in the claims below, followed by a functional statement, are intended to define and cover whatever structural, physical, chemical or electrical element or structure, or whatever method step, which may now or in the future exist which carries out the recited function, whether or not precisely equivalent to the embodiment or embodiments disclosed in the specification above, i.e., other means or steps for carrying out the same functions can be used; and it is intended that such expressions be given their broadest interpretation.

What is claimed is:

1. A cooking appliance comprising:
   (a) a housing;
   (b) a vessel provided to be placed in the housing and arranged to receive a cooking bath;
   (c) an emptying device provided in said vessel for permitting the cooking bath to be drained from the vessel;
   (d) an emptying receptacle for receiving the cooking bath from the vessel via said emptying device;
   (e) a first valve associated with said emptying device;
   (f) a maneuvering button associated with said emptying device; and
   (g) a control mechanism mounted on said emptying receptacle and interposed between said maneuvering button and said first valve for moving said first valve between open and closed positions in response to movements of said maneuvering button;
   (h) wherein said emptying receptacle is removable from said housing.

2. The appliance of claim 1, wherein said maneuvering button is mounted on said emptying receptacle.

3. The appliance of claim 2, wherein said housing is provided with a lateral opening through which said emptying receptacle can be introduced into said housing.

4. The appliance of claim 3, wherein said maneuvering button is mounted on an outer lateral face of said emptying receptacle.

5. The appliance of claim 4, wherein said control mechanism comprises a first cam provided to cooperate with said first valve.

6. The appliance of claim 5, wherein: said control mechanism comprises a movable control piece that carries said first cam and that is provided with a funnel; said appliance further comprises an inlet conduit coupled to said receptacle and having a filling opening disposed for receiving cooking bath liquid from said funnel; and said funnel is brought into a position for receiving cooking bath liquid when said cam has been moved to a position for opening said first valve.

7. The appliance of claim 6, wherein said movable control piece is coupled to be rotated in response to rotation of said maneuvering button.

8. The appliance of claim 7, wherein said first cam is arranged above said funnel.

9. The appliance of claim 8, wherein said control mechanism comprises a bolt provided to cooperate with a striking plate associated with said first valve when said first valve is brought to an open position.

10. The appliance of claim 9, wherein said bolt is formed by a lateral face of said first cam.

11. The appliance of claim 10, further comprising a conduit having a lower end, and wherein said first valve comprises a moveable blocking piece housed in said conduit, and said striking plate is formed by a longitudinal slot in the lower end of said conduit.

12. The appliance of claim 1, further comprising a movable safety device comprising; a second cam mounted to be driven by said control mechanism when said maneuvering button is displaced to open said first valve; a third cam provided to be driven by said control mechanism when said maneuvering button is subsequently displaced to close said first valve; and a blocking abutment provided to block said control mechanism in order to prevent opening of said first valve.

13. The appliance of claim 12, further comprising a flexible blade associated with said movable safety device and operative for causing said movable safety device to be pushed back by said emptying receptacle while said emptying receptacle is being introduced into said housing, wherein said flexible blade is depressed when said movable safety device reaches a stop position.

14. The appliance of claim 13, further comprising a thermostatic second valve associated with said emptying device.

15. The appliance of claim 14, further comprising a filter disposed upstream of said emptying device.

16. The appliance of claim 1, wherein said housing is provided with a lateral opening through which said emptying receptacle can be introduced into said housing.

17. The appliance of claim 1, wherein said control mechanism comprises a first cam provided to cooperate with said first valve.

18. The appliance of claim 1, wherein said control mechanism comprises a bolt provided to cooperate with a striking plate associated with said first valve when said first valve is brought to an open position.

19. The appliance of claim 1, further comprising a movable safety device comprising: a second cam mounted to be driven by said control mechanism when said maneuvering button is displaced to open said first valve; a third cam provided to be driven by said control mechanism when said maneuvering button is subsequently displaced to close said first valve; and a blocking abutment provided to block said control mechanism in order to prevent opening of said first valve.

20. The appliance of claim 1, further comprising a thermostatic second valve associated with said emptying device.

21. The appliance of claim 1, further comprising a filter disposed upstream of said emptying device.

* * * * *